C. W. Saladee,
Curry Comb.
No. 46,710. Patented Mar. 7. 1865.
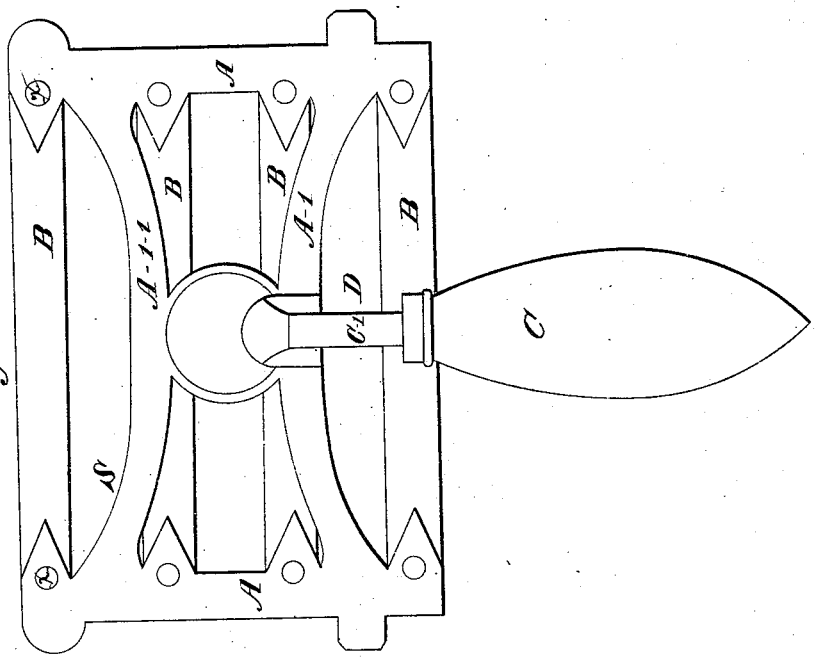
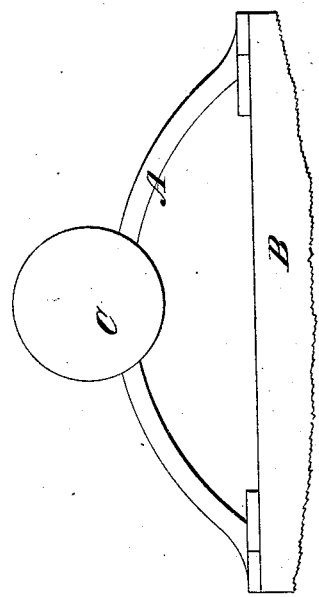
Witnesses:
E. A. Saladee
John Murray
Inventor:
Cyrus W. Saladee

UNITED STATES PATENT OFFICE.

CYRUS W. SALADEE, OF PUTNAM, OHIO.

IMPROVEMENT IN CURRY-COMBS.

Specification forming part of Letters Patent No. 46,710, dated March 7, 1865.

*To all whom it may concern:*

Be it known that I, CYRUS W. SALADEE, of Putnam, county of Muskingum, State of Ohio, have invented a new and Improved Mode of Applying Backs and Handles to Curry-Combs; and I do hereby declare that the following is a full and exact description thereof, reference being had to the accompanying drawings, and to the letters of reference marked thereon.

The nature of my invention consists in providing the curry-comb with an arched back or frame to which is connected the ordinary handle, placed at right angles with the teeth, and by which is gained the desirable advantage of two separate ways of grasping the comb, viz: The comb may be used first by grasping the ordinary handle C, Figure 1; or, when that is not desirable, the comb may be grasped immediately over the top of the same by letting the thumb of the right hand pass under the handle $c'$ at D and there press against the cross-bar A' of the frame A, Fig. 1, and with the ends of the fingers grasp the opposite cross-bar, A'', at S.

There are some positions in which the curry-comb must needs be used upon the horse that will not admit of grasping it immediately over the back, while there are other positions in which the comb cannot be handled comfortably unless a permanent hold can be had of it immediately over the back or teeth of the same.

By this invention, as already intimated, I combine the ordinary handle C with the arched back or frame A in such manner as to admit of using the comb by a comfortable grasp upon the same, whether held by the handle C or grasped immediately over the top of the comb or teeth, as already shown and described.

To enable others skilled in the art to make and use my said invention, I will proceed to describe its construction and operation.

In the first place, I produce the frame or back of the comb A either by stamping the same out of a plate of metal or casting it malleable, with the handle $c'$, Fig. 1, permanently attached to the top of the arched frame A A A' A'' in the manner substantially as shown in the drawings. This frame or back of the comb A, I arch up in the center (see A, Fig. 2) sufficiently high to admit of the thumb and fingers of the hand to pass between the cross-bars A' A'' of the frame A A and the top of the teeth-bars B B B B in the manner as already shown and described. The teeth-bars B are secured to the ends of the frame A by means of the rivets $x$, or by any other of the various well known modes of doing the same.

I am aware that two metallic handles placed over the top of the comb, with a view of giving a hold upon the comb in that manner, is known; but I am not advised that the idea of an arched frame or back upon curry-combs, in combination with the handle of the same, as hereinbefore shown and described, is not strictly novel and of my invention.

I therefore disclaim the idea of two metallic handles secured to the sides or ends of the curry-comb, whether attached to the comb on a line parallel with the teeth of the same, diagonally across the corners over the top of the comb, or across the ends of the comb at right angles with the teeth of the same. As for this device, I have already obtained Letters Patent of the United States, dated December 27, 1864, and a reissue upon the same allowed and patent to issue on the 24th January, 1865.

In the invention last above mentioned and hereby disclaimed I had in view these two points, viz:—First, to divest the comb of the ordinary handle placed or attached to the comb in the well-known right-angle position from the teeth; and, secondly, to use the comb by that of no other grasp or hold than by the two metallic handles placed parallel to each other on the top of the comb, or in a position immediately over the top of the teeth of the same. But further experience in the use of a comb constructed upon the plan of my patent aforesaid has shown me the absolute necessity of the old handle C, Fig. 1, in combination with a device that will admit of grasping or holding the comb immediately over the top of the same, as hereinbefore shown and described, and which fact, I may be permitted to state, has led me to the invention hereby presented for another grant of Letters Patent.

Now, what I claim as new, of my invention, and desire to secure by Letters Patent, is—

The arched frame or back A A A' A'' of the curry-comb, in combination with the handle C $c'$ in the manner and for the purpose substantially as shown and described.

CYRUS W. SALADEE.

Witnesses:
E. A. SALADEE,
JOHN MURRAY.